United States Patent [19]

Gerbert et al.

[11] Patent Number: 5,663,493
[45] Date of Patent: Sep. 2, 1997

[54] APPARATUS AND METHOD FOR MEASURING RELATIVE COMPRESSION

[75] Inventors: Johannes C. M. Gerbert, Enschede; Johannes H. M. van der Kuil, Haaksbergen, both of Netherlands

[73] Assignee: Fluke Corporation, Everett, Wash.

[21] Appl. No.: 649,343

[22] Filed: May 17, 1996

[51] Int. Cl.$^6$ ............................................. G01M 15/00
[52] U.S. Cl. ............................ 73/116; 73/115; 340/439
[58] Field of Search ............................ 73/115, 116, 117.2, 73/117.3, 118.1, 119 A; 123/419, 425, 436; 364/431.01, 431.03; 340/439

[56] References Cited

U.S. PATENT DOCUMENTS

| | | | |
|---|---|---|---|
| 3,713,331 | 1/1973 | Petersen et al. | 73/117.2 |
| 3,765,233 | 10/1973 | Germann | 73/117.2 |
| 3,938,378 | 2/1976 | Fineman et al. | 73/117.2 |
| 3,952,586 | 4/1976 | Hanson et al. | 73/117.2 |
| 4,027,532 | 6/1977 | Trussell et al. | 73/117.2 |
| 4,050,297 | 9/1977 | Pettingell et al. | 73/117.2 |
| 4,062,232 | 12/1977 | Sutphin, Jr. | 73/117.2 |
| 4,144,746 | 3/1979 | Maringer et al. | 73/117.2 |
| 4,309,900 | 1/1982 | Kreft et al. | 73/117.2 |
| 5,189,907 | 3/1993 | Marino et al. | 73/116 |

*Primary Examiner*—George M. Dombroske
*Attorney, Agent, or Firm*—Douglas J. Barker

[57] ABSTRACT

In accordance with the present invention, a measurement instrument employing an improved method for measuring relative compression is provided. The compression signal is first acquired by digitizing the battery voltage over multiple engine cycles using an analog to digital converter (ADC) to obtain a series of digital samples. The compression signal is filtered using a low pass digital filtering technique such as a finite impulse response (FIR) filter along with spike removal that removes high frequency noise and impulse-type ignition noise from the compression signal. The filtered compression signal is then "zero-lined", meaning that each of the peaks corresponding to a compression curve of a cylinder, which are bounded on either side, are re-scaled such that the local minima reside along a zero base line. Next, the zero-lined compression signal is averaged over the multiple cycles of the engine. Finally, the averaged signal is scaled and displayed in a manner allowing the relative compression levels between the cylinders of the engine to be readily ascertained.

15 Claims, 6 Drawing Sheets

APPARATUS AND METHOD FOR MEASURING RELATIVE COMPRESSION

BACKGROUND OF THE INVENTION

This invention relates generally to electronic instruments for servicing internal combustion engines and in particular to an instrument and method for determining relative compression between cylinders in an internal combustion engine by monitoring the battery voltage.

Internal combustion engines must have adequate compression levels within each cylinder in order to operate properly. Testing the compression level in each cylinder has traditionally been performed by removing the spark plug or diesel injector and measuring the pressure generated in the cylinder by turning the engine over through a cycle using an electric starter motor. The measurement taken thus provides an absolute compression level or a compression ratio. Measuring the pressure in this manner is tedious and time consuming, particularly when the goal is simply to determine whether or not the engine has a cylinder with a compression problem, and if so, to identify the cylinder or cylinders with compression problems so that they may be repaired.

A non-invasive technique of measuring relative compression has been successfully employed by automotive service technicians to diagnose compression problems. The relative compression test provides a visual comparison of all of the cylinders of the engine, typically in the form of a bar graph with the highest compression level determining the overall scaling factor. Relative compression testing is useful to the automotive service technician because in the typical engine service scenario because it provides a quick and reliable diagnosis of typical engine compression problems. Cylinders typically fail by losing compression rather than gaining compression. The remaining "good" cylinders may be used to determine an acceptable level of compression by setting an upper limit on the graph to compare the remaining cylinders to.

A basic measurement technique to perform a relative compression test has been detailed in U.S. Pat. No. 4,309,900, "Apparatus for Measurement and Display of Relative compression by Cylinder", to Kreft et al. Kreft et al. disclose an engine tester for determining relative compression by cylinder by sampling the starter current as timed by engine cylinder firings. A microprocessor correlates a cylinder number one signal with a predetermined firing order of the cylinders to display the relative compression level by cylinder.

Relative compression is typically measured by monitoring the battery current during the "cranking" phase when the electric starter motor turns the engine over through its cycle. One engine cycle is commonly understood to comprise a full 360 degree rotation of the engine as bounded by the successive firing of the cylinder number one. The engine is deliberately disabled so that it does not start during the cranking phase. The battery current varies as a function of the compression in each cylinder during the cranking phase because the starter motor draws more current as higher levels of compression create more mechanical resistance reflected back into the starter motor. The battery voltage in turn varies as a function of the battery current because the battery has internal resistance which develops a voltage drop. Either battery voltage or battery current may be measured to obtain a compression signal.

The advantage of the relative compression measurement technique over measuring the absolute pressure individually in each cylinder is the relative ease in obtaining useful diagnostic information about the compression levels in each cylinder engine. A handheld measurement instrument suitable for use in the automotive service environment to perform a relative compression measurement may be called upon for use in wide variety of automobiles. Furthermore, the electronic instrument may be used by automotive technicians who have only limited or infrequent experience in making a relative compression measurements. Thus, obtaining a relative compression measurement in a measurement instrument which achieves improved accuracy and with decreased susceptibility to sources of measurement error is desirable to the automotive service technician.

SUMMARY OF THE INVENTION

In accordance with the present invention, a measurement instrument employing an improved method for measuring relative compression is provided. The measurement instrument monitors the battery voltage or current in an engine during the cranking phase in which the engine is rotated through an engine cycle using an electrical starter motor which draws electrical current from the battery. A complete engine cycle comprises a complete compression of each of the cylinders of the engine, which typically number four, six, or eight cylinders. Because the battery has internal resistance, the instantaneous voltage across the battery terminals varies as a function of the cranking resistance of the engine which in turn varies according to the compression of each cylinder, thus allowing the battery voltage to be monitored to obtain the compression signal.

The compression signal is first acquired by digitizing the battery voltage over at least two engine cycles using an analog to digital converter (ADC) to obtain a series of digital samples. The present invention is an improvement over the prior art because the relative compression signal may be acquired more easily in several ways. First, the battery voltage rather than the battery current may be acquired, thereby simplifying the acquisition of the relative compression signal since only the battery terminals need by probed with voltage probes, which is simpler and less expensive than using a d.c. current probe. Second, the sampling rate according to the present invention is substantially higher than the rate that the cylinders are fired so that the precise timing of each sample is not critical, thereby eliminating the need to obtain a cylinder clock signal as required in the prior art to synchronize the sample clock to the compression peaks of the cylinders. The digital measurement values measured from the battery voltage are assembled and stored as a time record in digital memory in the measurement instrument.

In order to determine the identity of each cylinder, an inductive pickup probe or other sensor may be used to generate a trigger signal for the measurement instrument that corresponds to a designated cylinder, typically cylinder number one. If the firing order and the total number of cylinders are known, typically as set forth in the specifications for the particular engine being tested, it is possible to correctly assign a cylinder number to each of the relative compression peaks appearing on the display in the manner taught by Kreft et al. The trigger signal is correlated with the compression peak of cylinder number one and the remaining cylinders are assigned cylinder numbers based on the predetermined firing order which is provided to the measurement instrument by the user.

The present invention is a further improvement over the prior art in providing a more accurate and error free determination of relative compression by employing a method of operating on the compression signal stored in the time record. First, the compression signal is filtered using a low pass digital filtering techniques including finite impulse response (FIR) filtering and spike removal that removes high frequency noise from the compression signal while preserving the desired peaks and valleys of corresponding to the compression. The FIR filtering operation may be implemented entirely in software or as a discrete hardware circuit in a manner well known in the art for FIR filters. The filtering could also be accomplished as an analog low pass filter inserted between the voltage input of the measurement instrument and the ADC to prevent high frequency signals from disturbing the sampling process.

The predominant form of noise to be removed is impulse noise from the ignition system of the automobile which shows up as "spikes" in the sampling process. In the preferred embodiment, spike removal is accomplished by sequentially comparing the values of first, second, and third successive samples stored in the time record. If the first and third samples are substantially equal while the second sample differs by an amount greater than a predetermined value, the second sample is defined as a spike and its value is replaced with one of the first or third values. The spike removal operation is performed along the entire length of the time record and the predetermined value may be found empirically to distinguish undesirable spikes from the compression signal in an optimal manner.

Next, the filtered compression signal is "zero-lined", meaning that each of the compression peaks corresponding to a compression curve of a cylinder are re-scaled such that the local minima on either side of the compression peak reside along a zero base line. Between each local minimum point on either side of a compression peak, a slope and offset value are calculated to move the compression peak down to a zero baseline. Each compression peak is thereby normalized to remove base line drift to facilitate comparison and averaging of the compression peak amplitudes along a common base line.

Next, the zero-lined compression signal is averaged over the multiple cycles of the engine. The corresponding peaks for each respective cylinder are averaged with each other across multiple engine cycles to obtain a more accurate measurement of the relative compression levels of each cylinder. Variations in engine speed which change the time delay between compression peaks over different engine cycles may be accounted for so that the averages of the compression peaks are performed relative to each peak value. If the compression of a cylinder is so low that no peak is detected, a missing peak detection algorithm may be employed to detect the position of the missing peak so that the remaining peaks may be properly located based on the timing of each of the remaining compression peaks.

Finally, the averaged signal is scaled and displayed in a manner allowing the relative compression levels between the cylinders of the engine to be readily ascertained. Typically, the relative compression is visually displayed in the form of a bar graph, one bar per cylinder, with the highest pressure cylinder determining the one hundred percent level on the display. All other cylinder levels necessarily appear at one hundred percent or less. From this relative compression display, the automotive service technician can readily determine if a cylinder or cylinders have compression problems by observing the relative compression levels of all the cylinders. Relative compression levels that deviate significantly below the compression level of the remaining cylinders are likely to be mechanically faulty.

One object of the present invention is to provide a measurement instrument for measuring relative compression in an engine.

Another object of the present invention is to provide a measurement instrument for more accurately measuring relative compression in an engine.

An additional object of the present invention is to provide a measurement instrument for more accurately measuring relative compression in an engine using an improved method of determining relative compression.

A further object of the present invention is to provide a measurement instrument for measuring relative compression in an engine by measuring the battery voltage during cranking and with simplified acquisition of the compression signal.

Other features, attainments, and advantages will become apparent to those skilled in the art upon a reading of the following description when taken in conjunction with the accompanying drawings.

DETAILED DESCRIPTION OF THE INVENTION

Figure 1:
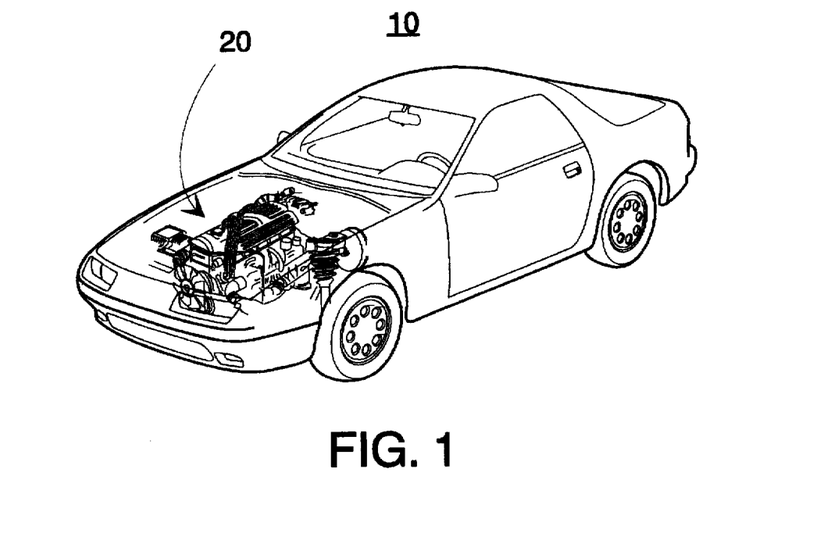
FIG. 1 is a cut-away view of a typical automobile according to the prior art containing an internal combustion engine that would potentially benefit in a service application from relative compression according to the present invention.

FIG. 1 is a cut-away view of a typical automobile 10 containing an internal combustion engine 20 according to the prior art. The automobile 10 is representative of the wide variety of vehicles that contain internal combustion engines which may require service and maintenance. Internal combustion engines must maintain adequate compression levels within each cylinder in order to operate properly. Mechanical faults that result in loss of compression must be identified and cured by the automotive service technician in order to restore proper operation of the engine. The majority of internal combustion engines manufactured for use in automobiles have four, six, or eight cylinders. The individual testing of each individual cylinder for compression which typically requires removing a spark plug and inserting a pressure gauge is therefore impractical for the typical service scenario in which a quick diagnosis of compression problems is needed.

Figure 2:
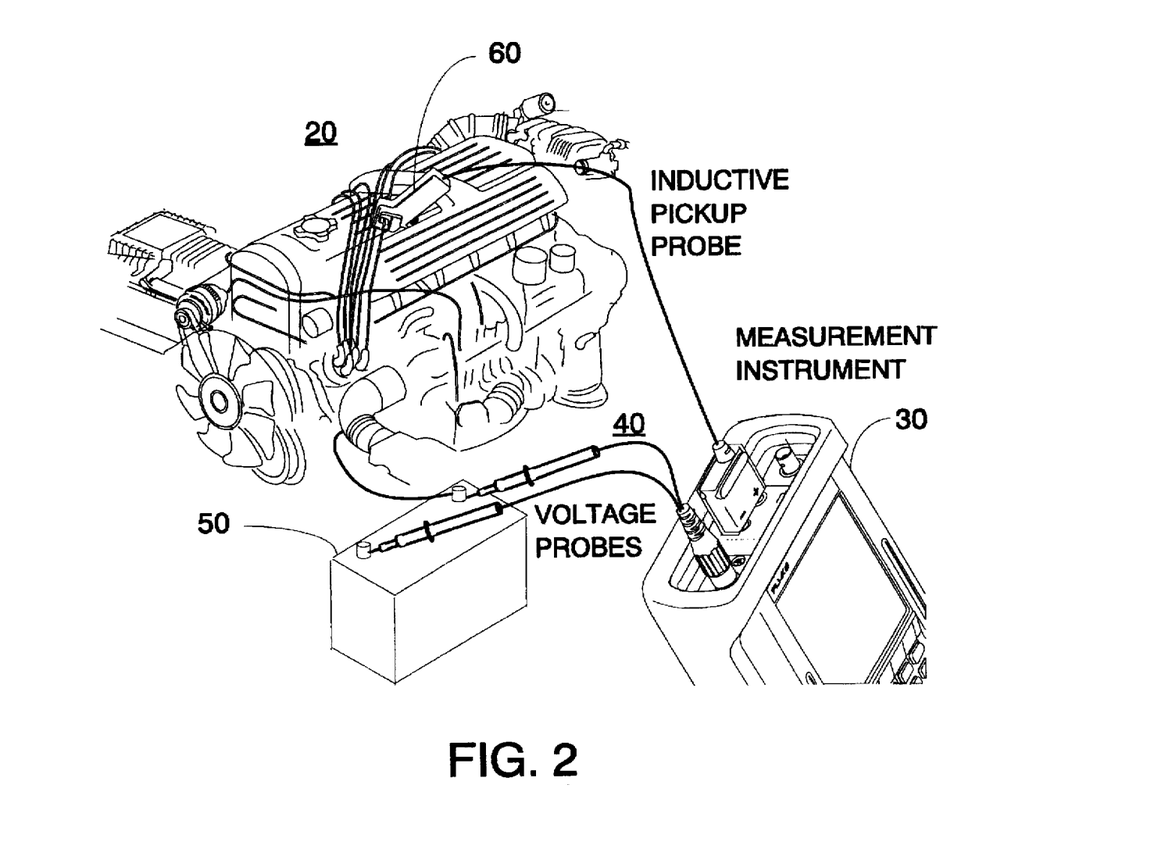
FIG. 2 is a view of a measurement instrument for measuring relative compression according to the present invention coupled to the internal combustion engine of FIG. 1.

FIG. 2 is a view of a measurement instrument 30 according to the present invention coupled to the internal combustion engine 20 in a test configuration for measuring relative compression. Internal combustion engines are typically started by cranking the engine with an electrical starter motor that draws current from a battery. The method of relative compression testing takes advantage of the fact that the current drawn by the starter motor during the cranking phase is proportional the compression level of the engine.

The present invention is an improvement over the prior art in that the battery voltage rather than current may be measured to obtain a compression signal. A pair of voltage probes coupled to a voltage input of the measurement instrument 30 are coupled across the terminals of a battery 50. The battery 50 provides the energy for cranking the internal combustion engine 20 during the cranking phase when the internal combustion engine 20 is normally started. Because the battery 50 has an internal resistance, the voltage across the terminals will vary as a function of the current delivered by the battery 50. Each voltage variation which occurs as the result of a cylinder going though its compression cycle is a compression peak. The variation of the voltage as a function of current as measured and stored over at least one engine cycle of the cranking phase is the compression signal.

An inductive pickup probe 60 coupled to a trigger input of the measurement instrument 30 may be used to generate a trigger signal from the spark signal for cylinder number one in order for the instrument 30 to provide a display of the relative compression according to the actual cylinder numbers. The firing order of the engine, which is specified for each particular engine, must be provided to the measurement instrument 30 in order to properly map relative compression by cylinder number. Without the inductive pickup probe, a relative compression test may be still be performed as a quick check of relative compression but without the cylinder number mapping. If compression problems are detected, more in-depth analysis may then be performed to determine the cylinder number associated with the compression problem.

During the cranking phase, the internal combustion engine 30 is disabled, typically by shorting the primary coil side of the ignition coil. The measurement instrument 30 measures the voltage across the battery 50 at a sample rate substantially faster than the firing rate of the cylinders and each sample is sequentially stored in memory to build a time record that collectively comprises a compression signal.

Figure 3:
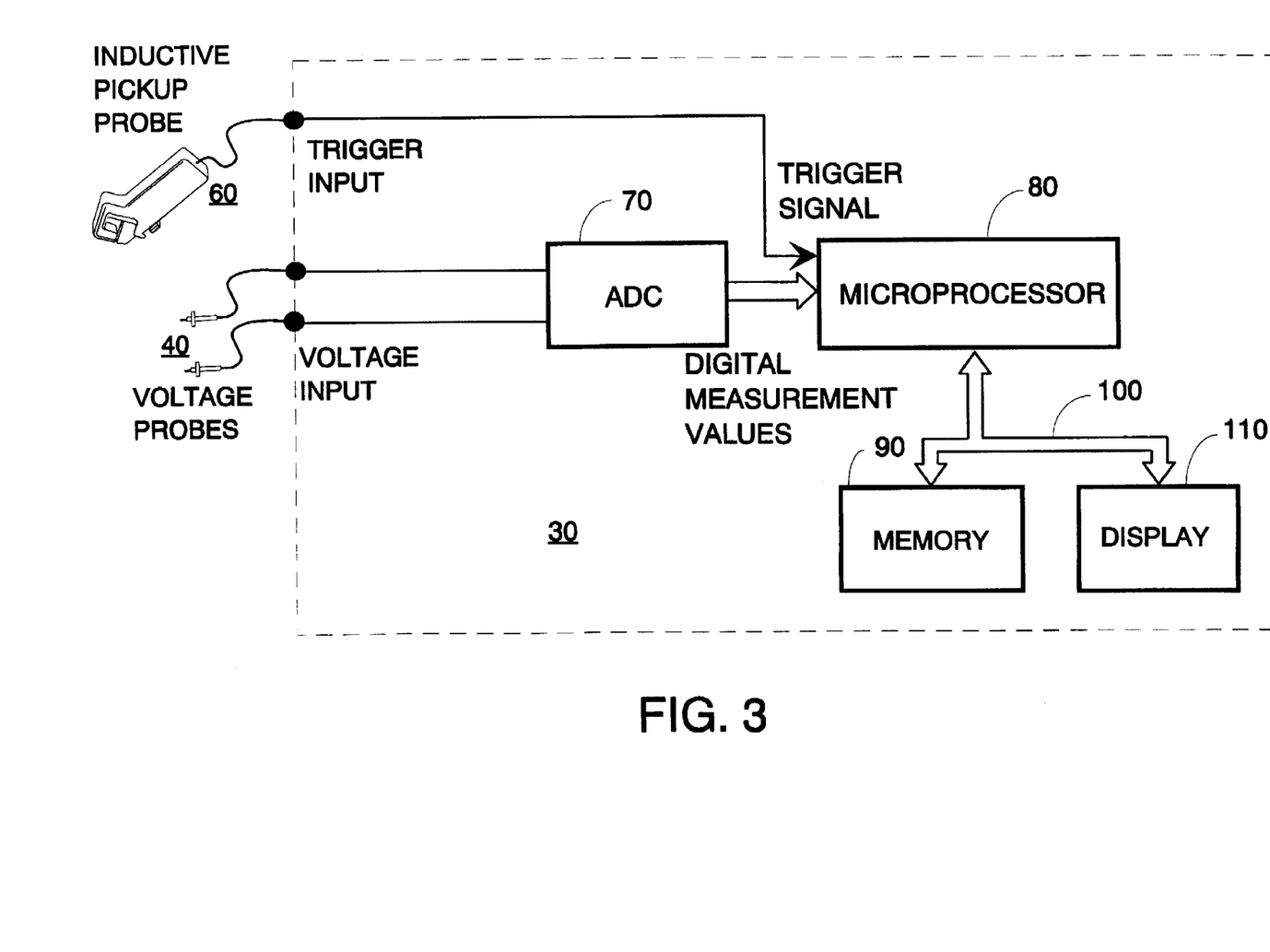
FIG. 3 is a simplified block diagram of the measurement instrument of FIG. 2.

FIG. 3 is a simplified block diagram of the measurement instrument 30 (shown in FIG. 2) according to the present invention. The pair of voltage probes 40 is coupled to the voltage input of the measurement instrument 30 which is further coupled to an analog-to-digital converter (ADC) 70. ADC 70 measures the voltage appearing across the voltage input and generates digital measurement values at a sample rate which is substantially higher than twice the firing rate of the cylinders so that the amplitude of each compression peak may be captured with acceptable accuracy without external synchronization of the sampling process. In this way, the timing of the samples does not have to be synchronized to a cylinder clock or other external signal in order to capture the peak values.

The stream of digital measurement values from the ADC 70 is coupled to a microprocessor 80 which further stores the digital measurement values in a memory 90 via a digital data bus 100. A display 110 is coupled to the microprocessor 80 via the digital data bus 100 for graphically displaying the results of the relative compression measurement which is calculated as explained further below.

The inductive pickup probe 60 is coupled to the trigger input of the measurement instrument 30 which is further coupled to the microprocessor 80. The trigger signal may then be used by the microprocessor 80 to correlate which of the compression peaks correspond to the cylinder number one. If the firing order of the cylinders is known, the microprocessor may then assign the actual cylinder numbers to each of the peaks.

Figure 4:
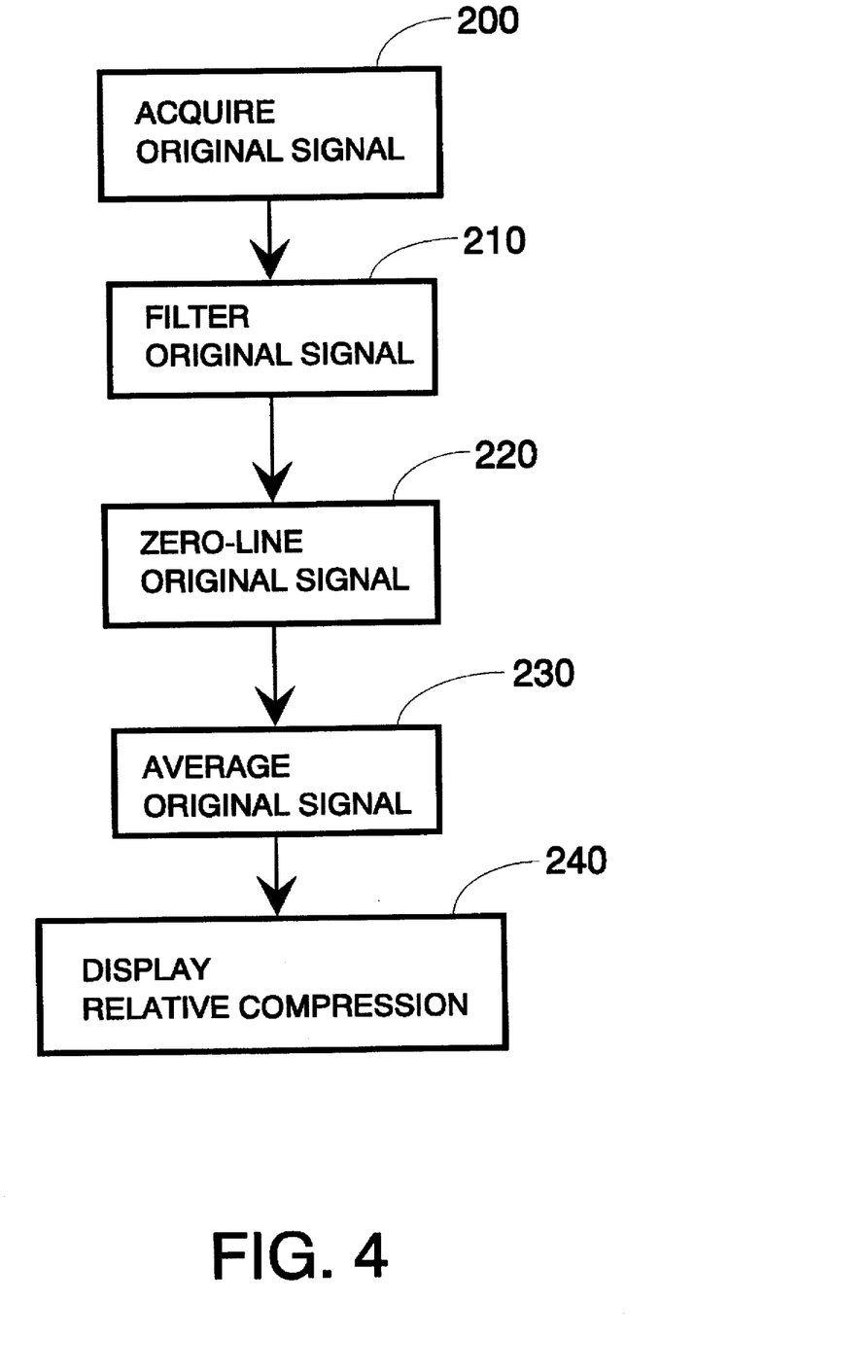
FIG. 4 is a flow chart of a method of measuring relative compression in the measurement instrument of FIG. 2.

FIG. 4 is a flow diagram of the method of processing the compression signal according to the present invention to obtain a more accurate relative compression measurement result. In process 200 labeled ACQUIRE COMPRESSION SIGNAL, the compression signal present across the battery 50 is sampled by the measurement instrument 30 as described above to obtain a time record. The time record is stored in the memory 90.

Figure 5:
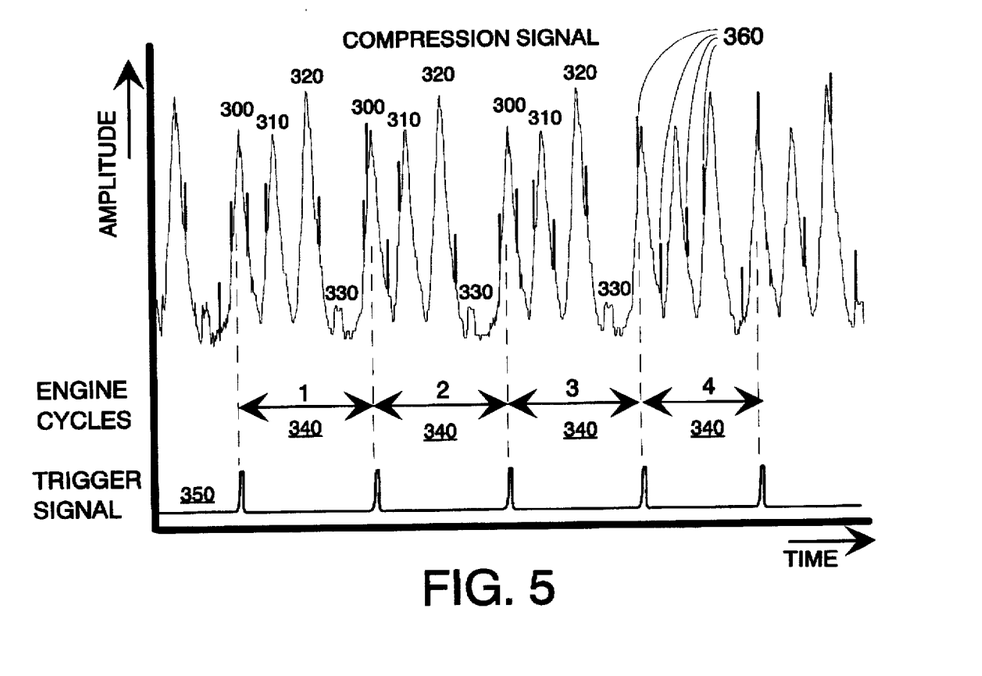
FIG. 5 is a graph of a compression signal which has been digitally sampled and stored in memory.

FIG. 5 is a graph of the compression signal captured as the time record according to the process 200. The contents of the time record are displayed on the coordinates of amplitude versus time. As seen in the graph, a trace is plotted containing a number of compression peaks 300, 310, 320, and 330. Each of the compression peaks 300, 310, 320, and 330 corresponds to the cylinders of a four cylinder engine captured over four engine cycles 340 of the internal combustion engine 30.

As displayed, the compression peaks 300, 310, 320, and 330 all have maximum values in the positive direction as would be expected with measuring the current drawn from the battery 50. In the preferred embodiment, the voltage across the battery 50 is measured instead which means the trace would be inverted from that shown. Although the trace is shown this orientation for clarity of illustration, actually inverting the digital measurement values is not necessary to practice the present invention.

The time record may also include extraneous noise from the electrical system of the automobile 10 or from other sources that may corrupt the measurement. Such noise tends to be primarily at higher frequencies and is random in nature and is therefore susceptible to removal by low pass filtering and smoothing techniques.

Superimposed on the compression signal throughout the time record are spikes 360. The spikes 360 are induced by the ignition system of the internal combustion engine 20. Because the spikes 360 are essentially impulse signals, each spike is typically only one sample wide and causes a substantial amplitude deviation from neighboring samples. It is desirable to remove each of the spikes 360 in order to better measure the desired compression signal free of unwanted interference to obtain a more accurate measurement in a manner explained below.

Also shown in FIG. 5 is a trigger signal 350 shown in the lower trace that corresponds with the trigger signal received from the inductive pickup probe 60 which is coupled to receive the spark signal on the cylinder number one. The trigger signal 350 is used to determine the start of each engine cycle 340 as shown. Because the cylinder number one is known, the corresponding peak 300 may be correlated to the trigger signal 350 in order to assign cylinder numbers to the compression peaks 300, 310, 320, and 330. A firing order for the internal combustion engine 20 being measured must be provided to the microprocessor 80 in order to properly assign the cylinder numbers.

Referring back to FIG. 4, in process 210 labeled FILTER COMPRESSION SIGNAL, a variety of filtering operations may be performed to reduce the effects of extraneous noise on the measurement. Low pass filtering on a time record may be performed to remove random noise encountered during the sample process. Low pass filtering may be performed on the compression signal as stored in the time record in any number of ways including FIR (finite impulse response) and IIR (infinite impulse response) techniques well known in the art. The cutoff frequency of the filter may be selected according to the frequency range of the noise to be rejected but should not be low enough to materially affect the amplitude of the compression peaks 300, 310, 320, and 330.

In addition, another filtering operation that may be performed on the compression signal is spike removal to remove the effects of ignition system noise which appears as impulse noise. Spike removal involves comparing first, second and third samples which appear sequentially in any point in the time record. If the first and third samples are substantially equal but the second sample deviates by a value greater than a predetermined spike value, the value of the second sample is replaced with the value of the first sample. Alternatively, the value of the second sample may be replaced with the average of the first and third sample values. In this way, the spikes 360 (shown in FIG. 5) occurring anywhere along the time record may be removed without substantially affecting the desired compression signal.

Figure 6:
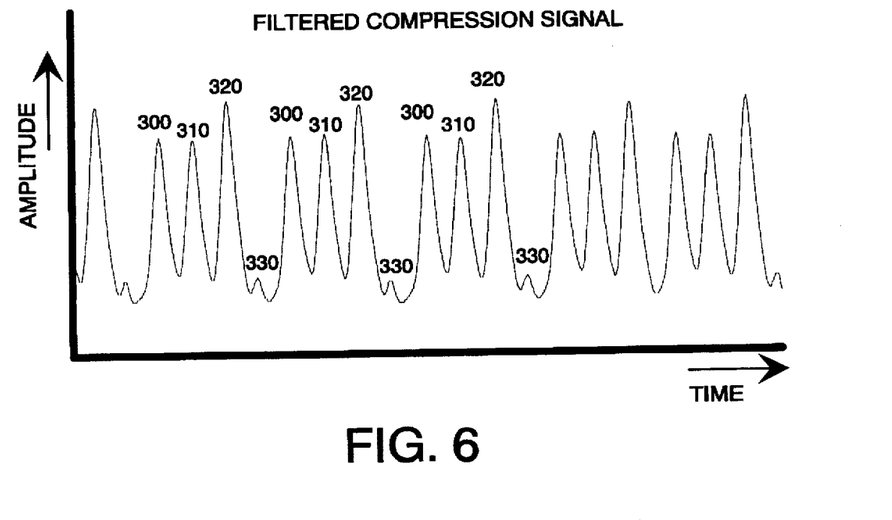
FIG. 6 is a graph of the compression signal of FIG. 5 which has been low-pass filtered.

FIG. 6 is a graph showing the effects of low pass filtering on the time record of FIG. 5. In the preferred embodiment, FIR filtering and spike removal operations were performed on the time record to remove high frequency extraneous noise leaving the amplitude of the compression peaks 300, 310, 320, and 330 substantially unchanged.

Figure 7:
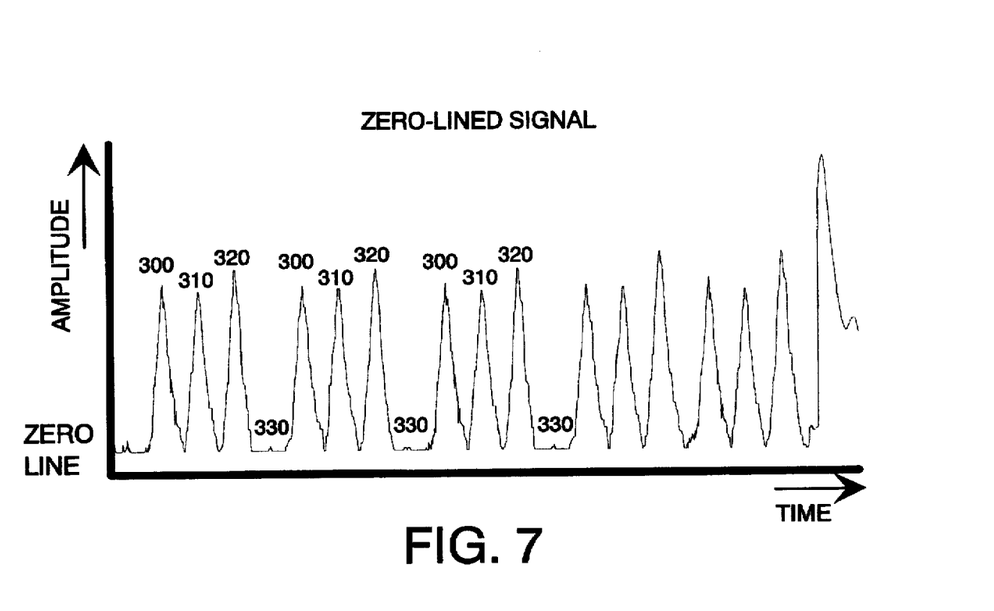
FIG. 7 is a graph of the compression signal of FIG. 6 in which each of the compression peaks has been zero-lined.

Referring back to FIG. 4, in process 220 labeled ZERO-LINE COMPRESSION SIGNAL, a zero-line operation is performed on each of the compression peaks 300, 310, 320 and 330. For each peak, the minimum levels before and after the peak are determined as the relative difference from the base line are determined. Between the minimum levels, an offset value and slope is calculated in order to linearly transform each compression peak to the zero baseline. The calculated offset amplitude is subtracted from each digital measurement value comprising the peak such that the minimum levels now lie on the base line. FIG. 7 is a graph of the compression signal that has been zero-lined such that each of the minimum points between the compression peaks 300, 310, 320, and 330 now lie on the base line and the compression peaks 300, 310, 320, and 330 are thereby normalized against each other.

Figure 8:
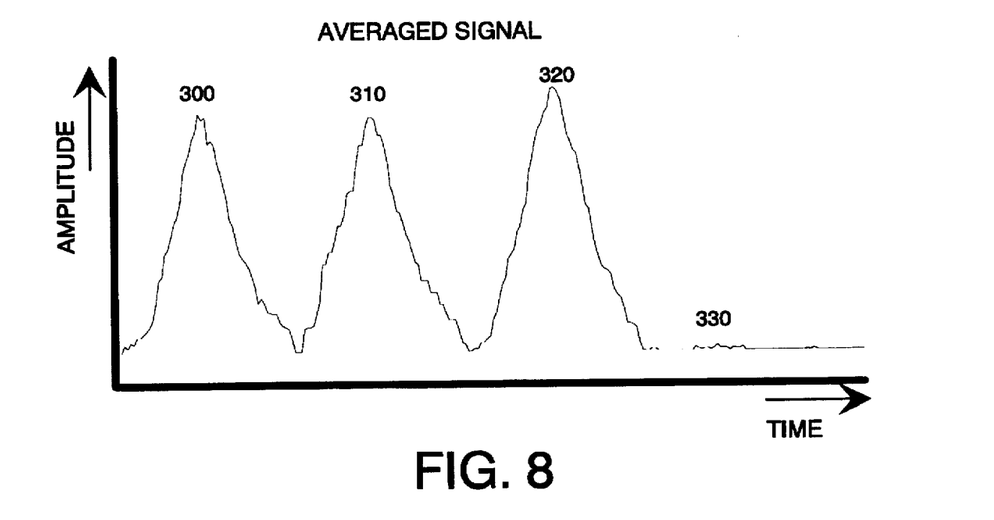
FIG. 8 is a graph of the compression signal of FIG. 7 in which the compression peaks of FIG. 7 corresponding to the respective cylinders have been averaged together.

Referring back to FIG. 4, in process 230 labeled AVERAGE COMPRESSION SIGNAL, an averaging operation is performed on each of the compression peaks 300, 310, 320, and 330 across the five cycles between each of the respective peaks to obtain one set of averaged peaks 300, 310, 320, and 330. The amplitude of the averaged compression peaks 300, 310, 320, and 330 are a more accurate measure of the compression levels. The averaging operation FIG. 8 is a graph of the compression signal that has been averaged across multiple engine cycles of the internal combustion engine 20 in order to obtain a more highly accurate relative compression measurement.

The compression peak 330 corresponds to a cylinder having little or no compression such that it cannot be measured. The compression peak 330 may thus have no peak at all. To ensure that the compression peaks 300, 310, 320, and 330 are properly averaged together over multiple cycles, a missing pulse detection algorithm may be used to locate the position of the low amplitude compression peak based on the locations of the remaining pulses. If the time between any two adjacent compression peaks exceeds the time between other two adjacent compression peaks within the same engine cycle by a predetermined fractional amount, there is determined to be a compression peak which is missing pulse between the two adjacent compression peaks. A missing pulse detection algorithm thus makes the overall measurement process more robust by maintaining the proper assignment of cylinder numbers to the remaining compression peaks.

In the preferred embodiment, the predetermined fractional amount is 160%. Thus, in FIG. 7, the time between compression peaks 320 and 300 exceeds the time between any other adjacent pairs of compression peaks by at least 160% and thus compression peak 330 is determined to be a missing pulse. In this way, the compression peak 330 is properly located and averaged over multiple cycles based on the locations of the compression peaks 300, 310, and 320 within each cycle.

Referring back to FIG. 4, in process 240 labeled DISPLAY RELATIVE COMPRESSION, the amplitude of each of the compression peaks 300, 310, 320, and 330 is determined. The highest amplitude of the four amplitude levels is used to set a 100% level on a bar graph and the remaining amplitude levels are plotted as a percentage of the highest amplitude.

Figure 9:
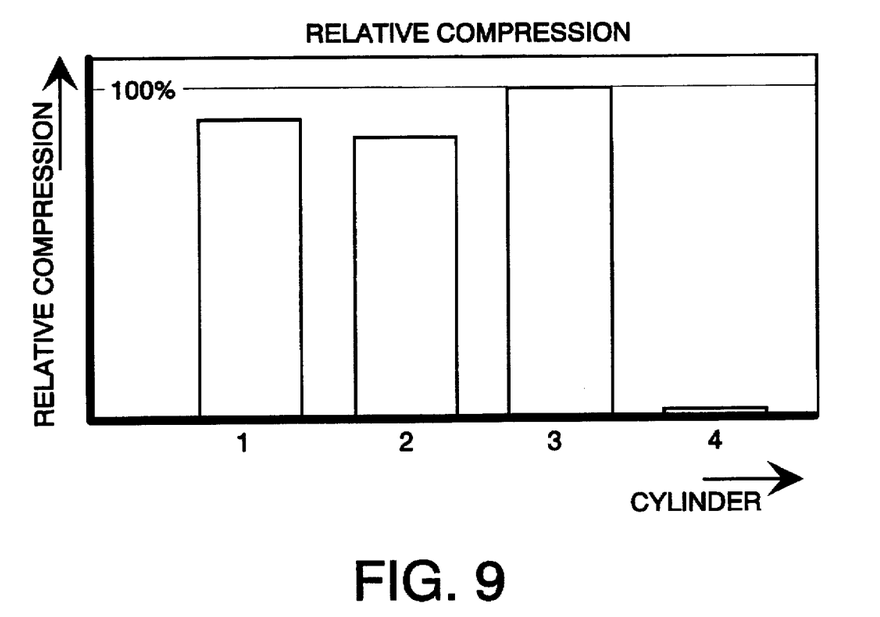
FIG. 9 is a bar graph of relative compression calculated from the height of the compression peaks of FIG. 8.

FIG. 9 is a graph of relative compression displayed in the form of a bar graph similar to what a user would see on the display 110 (shown in FIG. 3). As shown, the cylinder arbitrarily labeled three has the highest compression and determines the 100% level. Cylinders 1 and 2 have relative compression levels similar to that of cylinder 3 and would probably be determined to be within specification by the automotive service technician. However, cylinder 4 has relatively little compression as compared to cylinders 1, 2, and 3, indicating a compression problem that must be remedied.

Figure 10:
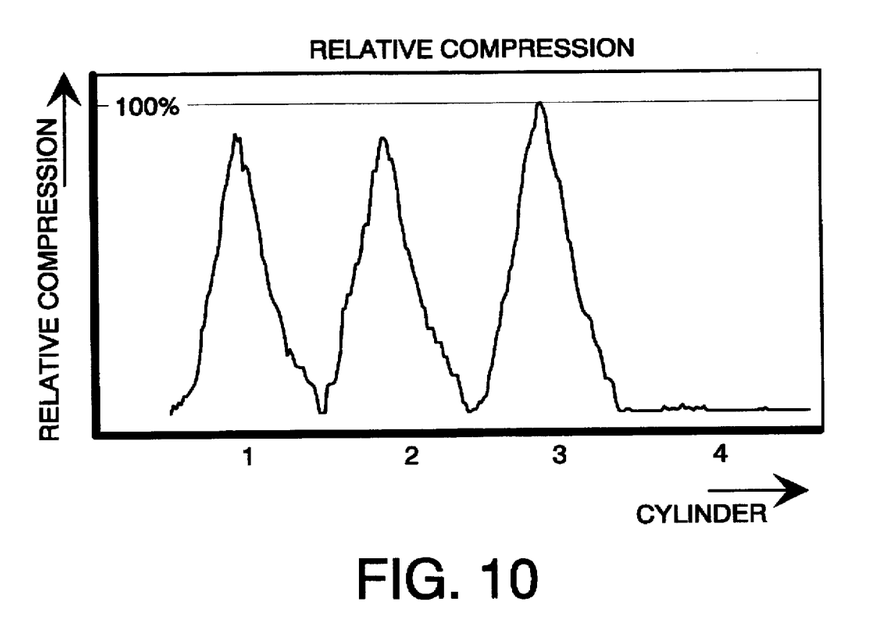
FIG. 10 is a line graph of relative compression calculated from the height of the compression peaks of FIG. 8.

FIG. 10 is a graph of relative compression displayed in the form of a trace graph similar to what a user would see on the display 110 (shown in FIG. 3) and is an alternative display to FIG. 9 for relative compression. Similar to the bar graph of FIG. 9, the peaks of the trace graph are normalized against the 100% level. The trace graph in addition provides the shape of each compression peak which provides the automotive service technician with further diagnostic information about the internal combustion engine 20.

It will be obvious to those having ordinary skill in the art that many changes may be made in the details of the above described preferred embodiments of the invention without departing from the spirit of the invention in its broader aspects. For example, the method of displaying the relative compression results may be numerical or graphical and in a format adapted for maximum utility for the automotive service technician. The measurement instrument may be readily adapted to measure battery current rather than battery voltage to obtain the compression signal. Therefore, the scope of the present invention should be determined by the following claims.

What we claim as our invention is:

1. In a measurement instrument adapted for measuring relative compression in an internal combustion engine, a method for obtaining improved measurement accuracy comprising:

(a) sampling a battery voltage to obtain digital measurement values during a cranking phase of said internal combustion engine over a plurality of engine cycles;

(b) storing said digital measurement values as a time record to obtain a compression signal containing a set of compression peaks for each of said engine cycles;

(c) filtering said time record to remove noise;

(d) performing a zero-line operation on each of said compression peaks;

(e) averaging each of said compression peaks with corresponding compression peaks between said plurality of engine cycles to obtain a set of averaged compression peaks;

(f) calculating said relative compression from the amplitude of said averaged compression peaks; and (g) visually displaying said averaged compression peaks as a trace graph.

2. A method for obtaining improved measurement accuracy of claim 1 further comprising:

(a) receiving a trigger signal during said cranking phase in response to a spark signal of a known cylinder;

(b) correlating said trigger signal with one averaged compression peak of said set of averaged compression peaks;

(c) assigning cylinder numbers to said set of averaged compression peaks based on a predetermined firing order for said internal combustion engine; and (d) displaying said relative compression according to said cylinder numbers.

3. A method for obtaining improved measurement accuracy of claim 1 wherein said digital measurement values are obtained at a sample rate that is substantially higher than twice the rate of said compression peaks.

4. A method for obtaining improved measurement accuracy of claim 1 further displaying said relative compression as a bar graph.

5. A method for obtaining improved measurement accuracy of claim 1 further averaging each of said compression peaks with corresponding compression peaks between said plurality of engine cycles while compensating for timing differences between said sets of compression peaks within each of said engine cycles to obtain said set of averaged compression peaks.

6. A method for obtaining improved measurement accuracy of claim 5 wherein a missing pulse detection algorithm determines the location of any of said compression peaks which comprise a missing pulse.

7. A method for obtaining improved measurement accuracy of claim 1 wherein said filtering comprises low pass filtering said compression signal.

8. A method for obtaining improved measurement accuracy of claim 1 wherein said filtering comprises spike removal on said compression signal.

9. A measurement instrument adapted for measuring relative compression in an internal combustion engine, comprising:

(a) an analog to digital converter with an input coupled to receive a battery voltage during a cranking phase over a plurality of engine cycles of said internal combustion engine, said analog to digital converter producing digital measurement values from said battery voltage;

(b) a memory for storing each of said digital measurement values;

(c) a display for visually displaying said relative compression; and (d) a microprocessor coupled to said analog to digital converter to receive and store said digital measurement values in said memory as a time record comprising a compression signal which contains a set of compression peaks for each of said engine cycles wherein said microprocessor processes said compression signal to obtain a set of averaged compression peaks, calculates said relative compression, and provides said relative compression to said display for visually displaying said set of averaged compression peaks as a trace graph.

10. A measurement instrument adapted for measuring relative compression in an internal combustion engine according to claim 9 further comprising an inductive pickup probe for receiving a trigger signal during said cranking phase in response to a spark signal of a known cylinder number, said inductive pickup probe coupling said trigger signal to said microprocessor wherein said microprocessor correlates said trigger signal with one compression peak of said set of averaged compression peaks, assigns cylinder numbers to each averaged compression peak of said set of averaged compression peaks based on a predetermined firing order; and provides said relative compression to said display according to said cylinder numbers.

11. A measurement instrument adapted for measuring relative compression in an internal combustion engine according to claim 9 wherein said relative compression is displayed as a bar graph.

12. A measurement instrument adapted for measuring relative compression in an internal combustion engine according to claim 9 wherein each of said compression peaks with corresponding compression peaks is averaged between said plurality of engine cycles while compensating for timing differences between said sets of compression peaks within each of said cycles to obtain said set of averaged compression peaks.

13. A measurement instrument adapted for measuring relative compression in an internal combustion engine according to claim 9 wherein said microprocessor performs low pass filtering on said time record.

14. A measurement instrument adapted for measuring relative compression in an internal combustion engine according to claim 9 wherein said microprocessor performs a spike removal operation on said time record.

15. A measurement instrument adapted for measure relative compression in an internal combustion engine according to claim 9 wherein said microprocessor performs a missing pulse detection operation on said time record to determine the location of any of said compression peaks which comprise a missing pulse.

* * * * *